United States Patent [19]

Yamamoto

[11] Patent Number: 5,503,431
[45] Date of Patent: Apr. 2, 1996

[54] ADJUSTABLE ENERGY ABSORBING STEERING COLUMN WITH ADJUSTMENT DISABLED DURING COLLISION

[75] Inventor: Yoshimi Yamamoto, Kosai, Japan

[73] Assignee: Fuji Kiko Co., Ltd., Tokyo, Japan

[21] Appl. No.: 394,302

[22] Filed: Feb. 24, 1995

[30] Foreign Application Priority Data

Feb. 25, 1994 [JP] Japan .................................. 6-027156

[51] Int. Cl.$^6$ ................................................ B62D 1/19
[52] U.S. Cl. ........................... 280/777; 280/775; 74/493; 188/376
[58] Field of Search ................................. 280/777, 775, 280/779, 780; 74/493, 492; 188/371, 376, 377

[56] References Cited

U.S. PATENT DOCUMENTS

| | | | |
|---|---|---|---|
| 4,022,495 | 5/1977 | Pizzocri | 74/492 |
| 4,297,911 | 11/1981 | Grahn et al. | 280/777 |
| 5,052,240 | 10/1991 | Miyoshi et al. | 280/777 |

FOREIGN PATENT DOCUMENTS

| | | |
|---|---|---|
| 60-81069 | 6/1985 | Japan . |
| 62-155067 | 10/1987 | Japan . |
| 4-75405 | 11/1992 | Japan . |

*Primary Examiner*—Margaret A. Focarino
*Assistant Examiner*—Peter C. English
*Attorney, Agent, or Firm*—Foley & Lardner

[57] ABSTRACT

A steering system for an automotive vehicle, arranged to effectively absorb an impact energy at a secondary collision in a head-on collision. The steering system comprises a steering column including an upper shaft and a lower shaft. The lower shaft is axially movably connected to the upper shaft and includes a first section connected to the upper shaft, and a second section. An upper bracket is connected to the steering column. An energy absorbing member is provided in a manner that the upper bracket is connected through the energy absorbing member to a vehicle body to be generally horizontally movable relative to the vehicle body. A first universal joint is disposed between the first and second sections of the lower shaft. A bearing bracket is rotatably supported to the vehicle body and rotatably supports the second section of the lower shaft. A second universal joint is disposed between a lower end section of the second section of the lower shaft and an upper end section of an intermediate shaft.

5 Claims, 8 Drawing Sheets

ADJUSTABLE ENERGY ABSORBING STEERING COLUMN WITH ADJUSTMENT DISABLED DURING COLLISION

BACKGROUND OF THE INVENTION

1. Field of the Invention

This invention relates to improvements in a steering system for a vehicle, and more particularly to such an arrangement of the steering system as to allow a steering column horizontally movable and to absorb the displacement stroke of the steering column, in order to effectively absorb an impact of a vehicle occupant at a vehicle collision.

2. Description of the Prior Art

In order to prevent a so-called secondary collision of a vehicle occupant at a head-on collision of an automotive vehicle, a variety of arrangements have been proposed and put into practical use. Such arrangements include a steering column structure in which a steering shaft contracts to absorb an impact energy when a vehicle occupant collides against a steering wheel, and an airbag located inside a steering wheel and adapted to inflate so that the vehicle occupant strikes against the inflated airbag thereby absorbing an impact energy of the vehicle occupant when a head-on collision of the automotive vehicle occurs.

Now, at the vehicle collision, it is usual that a driver seated on a driver's seat generally horizontally move toward the front section of a vehicle body. It is also usual that the steering column is disposed extending obliquely upwardly in a manner to incline relative to a front panel defining a passenger compartment.

Thus, the steering column extends having an axis crossing obliquely the breast section of a driver. Accordingly, when the driver horizontally move toward the vehicle body front section at a vehicle collision, the impact load of the driver develops a component force in the axial direction of the steering column and another component force in the horizontal direction. Under the action of this horizontal component force, when the steering column contracts, a gouging phenomena is made at the contracting section of the steering column thereby affecting an expected energy absorbing effect.

In view of the above, a structure for absorbing and attenuating the horizontal component force of the steering column in the secondary collision has been proposed and disclosed, for example, in Japanese Utility Model Provisional Publication Nos. 60-81069 and 62-155067 in which a bellows type or resilient energy absorbing body is interposed between the steering column and a front panel or dashboard.

However, drawbacks have been encountered in the above-discussed conventional steering systems, in which a space between the steering column and the front panel or the like is small, and therefore a sufficient stroke to absorb the horizontal component force at the secondary collision cannot be obtained even if the energy absorbing body is interposed in the space. Thus, in the conventional steering systems, an effective energy absorbing structure cannot be provided to protect a vehicle occupant upon the secondary collision.

SUMMARY OF THE INVENTION

It is an object of the present invention to provide an improved steering system for a vehicle, which can overcome drawbacks encountered in conventional steering systems for a vehicle.

Another object of the present invention is to provide an improved steering system for a vehicle, which can effectively absorb a horizontal component force of the impact load of a vehicle occupant in a secondary collision in which the vehicle occupant collides with a steering wheel.

A steering system of the present invention is for a vehicle and comprises a steering column including an upper shaft and a lower shaft. The lower shaft is axially movably connected to the upper shaft and includes a first section connected to the upper shaft, and a second section. An upper bracket is connected to the steering column. An energy absorbing member is provided in a manner that the upper bracket is connected through the energy absorbing member to a vehicle body to be generally horizontally movable relative to the vehicle body. A first universal joint is disposed between the first and second sections of the lower shaft. A bearing bracket is rotatably supported to the vehicle body and rotatably supports the second section of the lower shaft. A second universal joint is disposed between a lower end section of the second section of the lower shaft and an upper end section of an intermediate shaft.

With this steering system of the present invention, at a secondary collision in which the vehicle occupant collides with a steering wheel, the impact load of the vehicle occupant is input to a column jacket (forming part of the steering column) through a steering wheel and the upper shaft. The impact force input to the column jacket is absorbed by the energy absorbing member while the column jacket and the upper bracket horizontally move toward the front section of the vehicle body. Upon such a horizontal movement of the column jacket, the lower shaft horizontally moves thereby bending the first universal joint located at the upper side of the bearing bracket and allowing the bearing bracket to rotate. As a result, the horizontal movement of the lower shaft can be effectively and smoothly absorbed without applying a compulsory force to the steering column. This prevents lowering in impact absorbing effect, due to the horizontal component force of the impact load.

BRIEF DESCRIPTION OF THE DRAWINGS

In the drawings, like reference numerals designate like parts and elements throughout all the figures, in which.

DETAILED DESCRIPTION OF THE INVENTION

Figure 1:
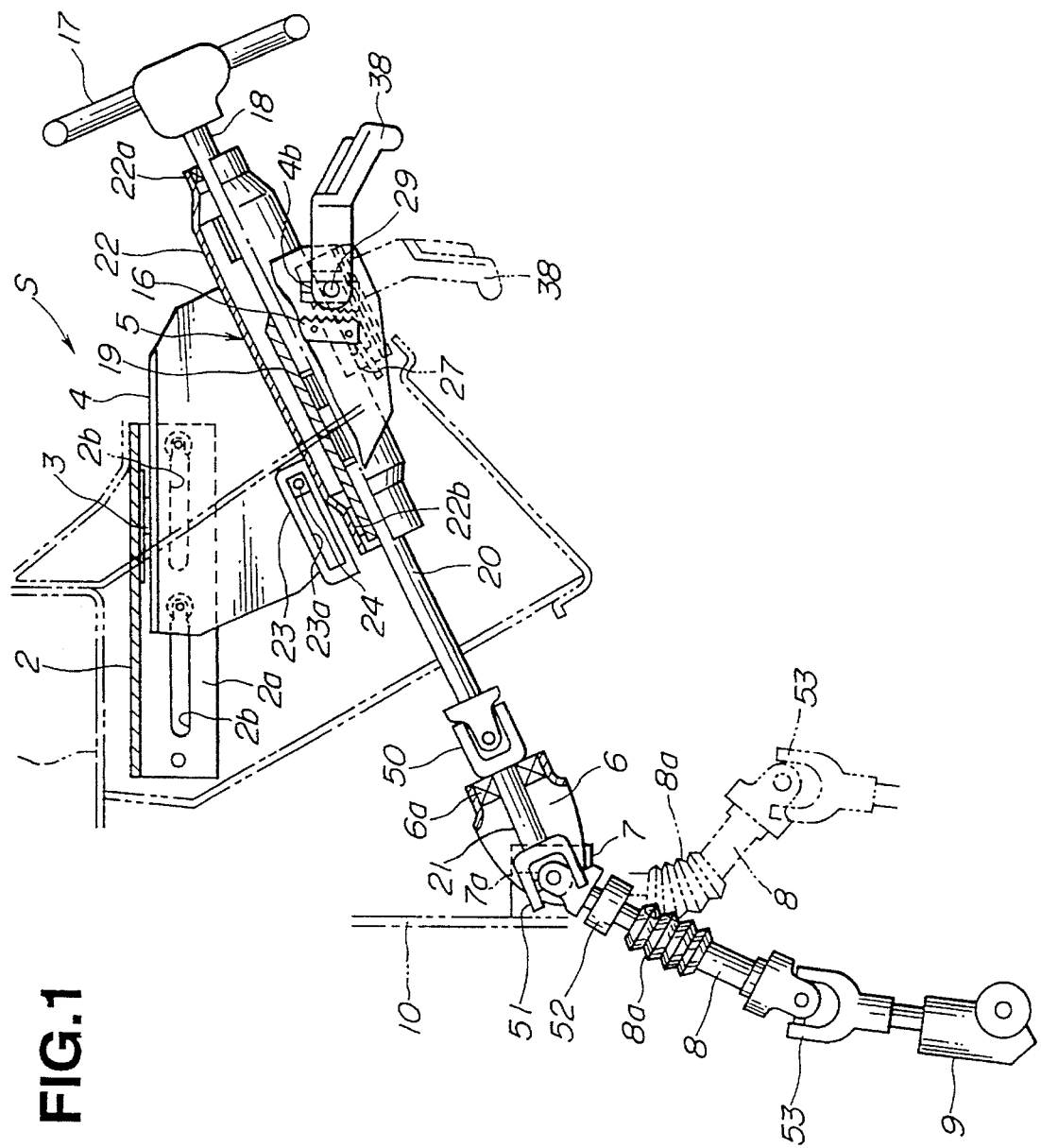
FIG. 1 is a side elevation, partly in section, of an embodiment of a steering system according to the present invention.

Referring now to FIGS. 1 to 8 and 10, more specifically to FIG. 1, of the drawings, a preferred embodiment of a steering system for a vehicle, according to the present invention is illustrated by the reference character S. The steering system S of this embodiment is for an automotive vehicle and mounted on a front section of a vehicle body 1. The steering system S comprises a mounting bracket 2 which is located horizontal and fixedly secured to a dashboard 1 forming part of a vehicle body. An upper bracket 4 is horizontally movably connected through an energy absorbing member 3 to the mounting bracket 2. The energy absorbing material 3 is arranged to be able to break and make its plastic deformation. A steering column 5 is supported to the upper bracket 4 in a manner to be able to be tilted and telescoped.

Figure 2:
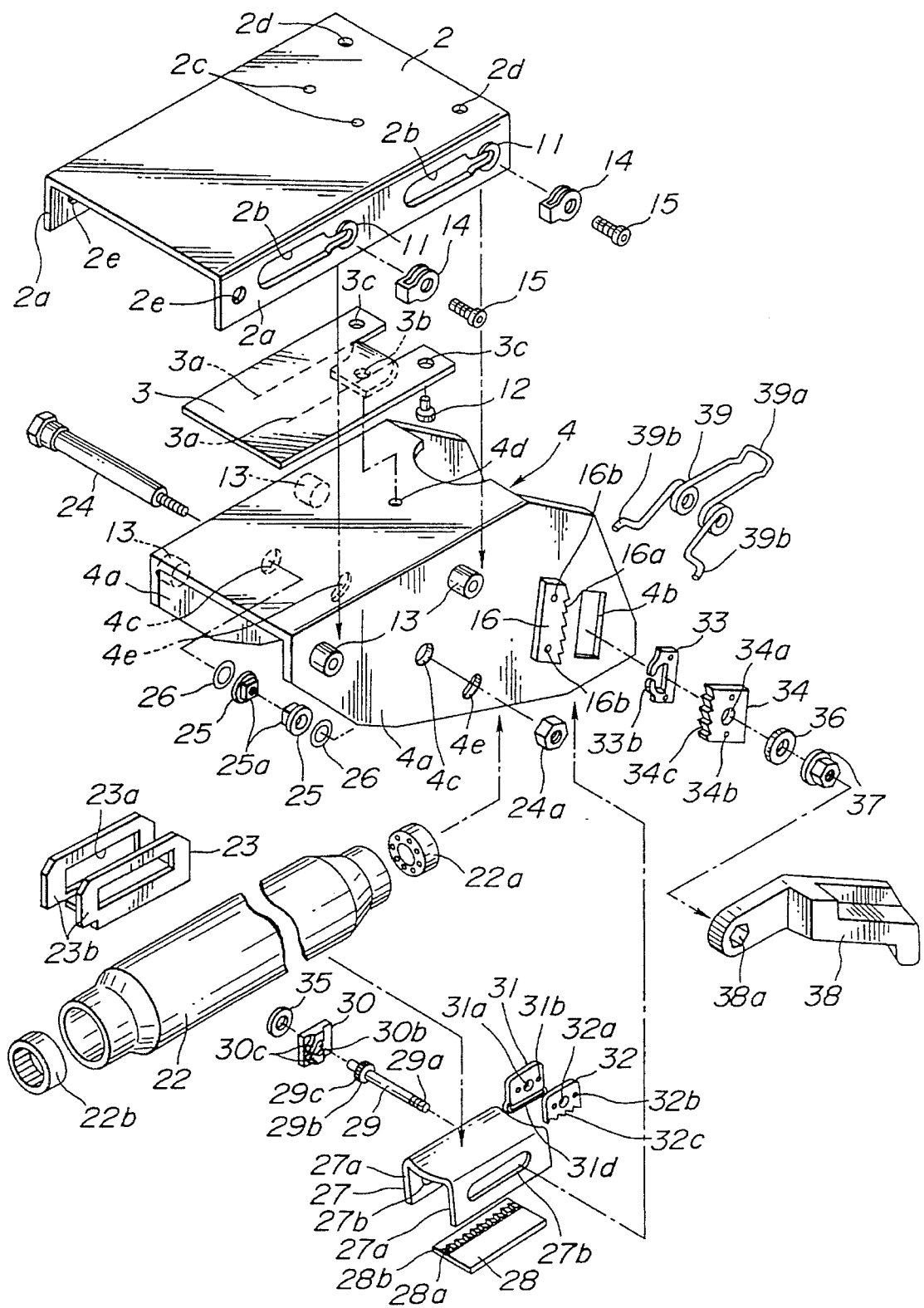
FIG. 2 is an exploded perspective view of an essential part of the steering system of FIG. 1.
Figure 3A:
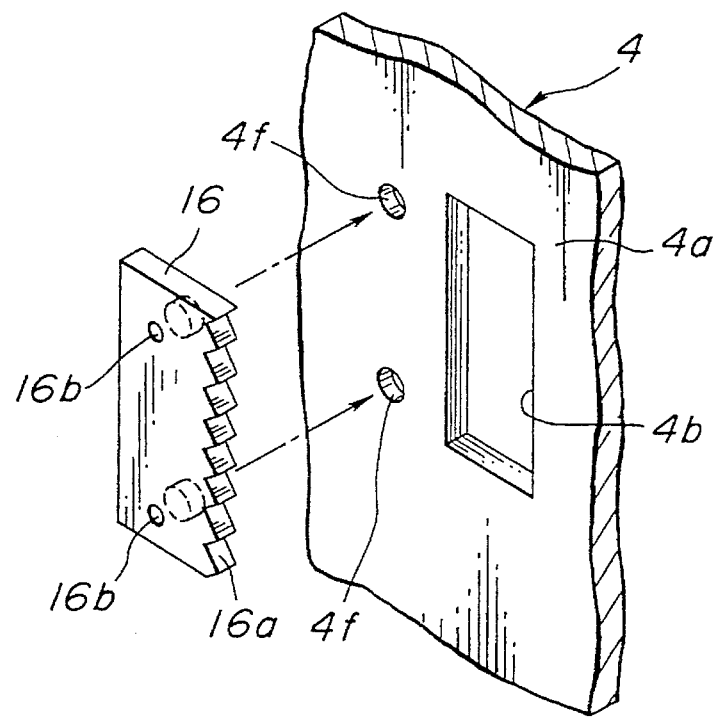
FIG. 3A is a fragmentary exploded perspective view of an essential part of the steering system of FIG. 1.
Figure 3B:
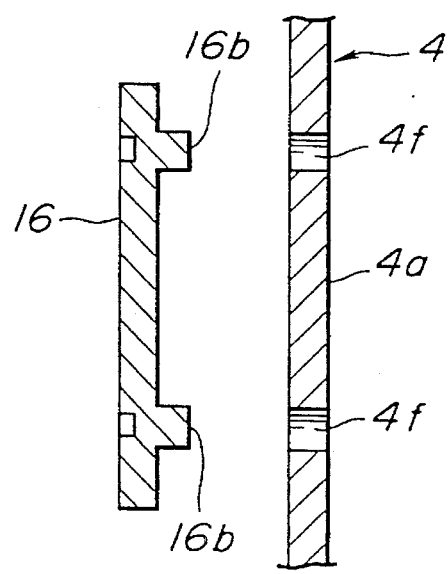
FIG. 3B is a sectional view of the essential part of FIG. 3A.

As shown in FIG. 2, the mounting bracket 2 is generally rectangular and has a predetermined length, and provided with side wall sections 2a, 2a having a predetermined width. Each of the side wall sections 2a, 2a is formed with two long slide holes 2b, 2b which are located spaced from each other in the longitudinal direction of the side wall section 2a. Each long slide hole 2b is formed narrow at its rear end portion (on a vehicle body side) as compared with a front end portion (on a passenger compartment side). A generally C-shaped plate 11 is fixed to a position (of the side wall section 2a) around the rear end portion by welding or the like. The mounting bracket 2 is formed at its upper plate or body section (no numeral) with two through-holes 2c, 2c for fixing a part of the energy absorbing member 3. Additionally, the mounting bracket 2 is formed with through-holes 2d, 2e for fixing the mounting bracket 2 to the vehicle body.

The energy absorbing member 3 is formed of a metal plate and formed with two linear cuts 3a, 3a which are separate and parallel with each other and extend in the longitudinal direction of the metal plate thereby forming a central band-like section (no numeral). The central band-like portion has a front end portion (no numeral) integral with the metal plate and a rear end portion (no numeral) which is bent downwardly and formed with a through-hole 3b. Additionally, the energy absorbing member 3 is formed at the corner portions of its rear section (no numeral) with two through-holes 3c which are located on the opposite sides of the central band-like section. The through-holes 3c of the energy absorbing member 3 coincide respectively with the through-holes 2c of the mounting bracket 2, upon which the energy absorbing member 3 is connected to the mounting bracket 2 with rivets 12. Additionally, the through-hole 3b of the energy absorbing member 3 coincides with a through-hole 4d of the upper bracket 4, upon which the energy absorbing member 3 is connected with the upper bracket 4.

The upper bracket 4 has a rectangular upper plate or body section (no numeral) which is parallel with the upper plate section of the mounting bracket 2 and has a predetermined length in the fore-and-aft direction of the vehicle body. Two opposite side wall sections 4a, 4a are integral with the upper plate section in a manner to be parallel with and spaced from each other. The side wall sections 4a, 4a are parallel respectively with the side wall sections 2a, 2a of the mounting bracket 2. Accordingly, the upper bracket 4 is formed generally U-shaped in cross-section. Each side wall section 4a is formed relatively narrow at its front section and relatively wide at its rear section. Each side wall section 4a is fixedly provided with two nuts 13, 13 which are located spaced from each other in the longitudinal direction of the upper bracket 4. The nuts 13 correspond respectively to the long slide holes 2b of the mounting bracket 2, and be brought into contact with slide plates 14 so as to be supported in a manner to be slidable in the fore-and-aft direction of the vehicle body under the action of screws 15. Each secrew 15 passes through the slide plate 14, the plate 11 and the side wall section 2a and be screwed in the nut 13. Each slide plate 14 is generally C-shaped in cross-section and installed in a manner that the plate 11 is put between the opposite side sections (no numerals) of the slide plate 14.

Each side wall section 4a of the upper bracket 4 is formed at its rear side with a rectangular long through-hole 4b for a tilt movement of the steering column 5. The side wall section 4a is further formed at its front side with a through-hole 4c. The upper plate section of the upper bracket 4 is formed with the through-hole 4d, in which the upper plate section is parallel with the upper plate section of the mounting bracket 2. Additionally, each side wall section 4a is formed with an engagement hole 4e to which an end section of a lift spring 39 is to be inserted.

A lock plate 16 is fixed on the side wall section 4a and located near and on the front side of the long through-hole 4b for the steering column tilt movement. The lock plate 16 is formed with teeth 16a which are located at the side of the long through-hole 4b. As clearly shown in FIG. 3, the lock plate 16 is formed at its upper and lower end sections with projections 16b, 16b which are formed under embossing. The projections 16b, 16b are fitted respectively in through-holes 4f, 4f formed in the side wall section 4a, so that the lock plate 16 is fixedly secured to the side wall section 4a.

Turning back to FIG. 1, the steering column 5 includes an upper shaft 18 on which a steering wheel 17 is coaxially and fixedly mounted. A splined tube 19 is coaxially mounted on and welded to the upper shaft 18. A lower shaft 20 has a splined section and inserted into the splined tube 19 in a manner to make a spline-connection between the splined tube 19 and the lower shaft 20, in which the lower shaft 20 is axially slidable relative to the splined tube 19. The lower shaft 20 has an lower end section which is connected through a universal joint 50 to a shaft 21 which is bendable and rotatable relative to the lower shaft 20. Additionally, a generally cylindrical column jacket 22 is provided in a manner to coaxially covering the upper shaft 18, the splined tube 19 and the lower shaft 20.

The column jacket 22 is provided at its upper and lower end portions with bearings 22a, 22b. A molded member made of a plastic, a shearing pin or the like is inserted in a section at which the splined tube 19 fits on the lower shaft 20 in a manner that the molded member or the like pierces the splined tube 19 and the lower shaft 20. Accordingly, a temporary connection is made between the splined tube 19 and the lower shaft 20 under the action of the molded member or the like, so that the molded member or the like is broken upon receiving an axial load exceeding a predetermined value thereby contracting the steering column 5.

Figure 10:
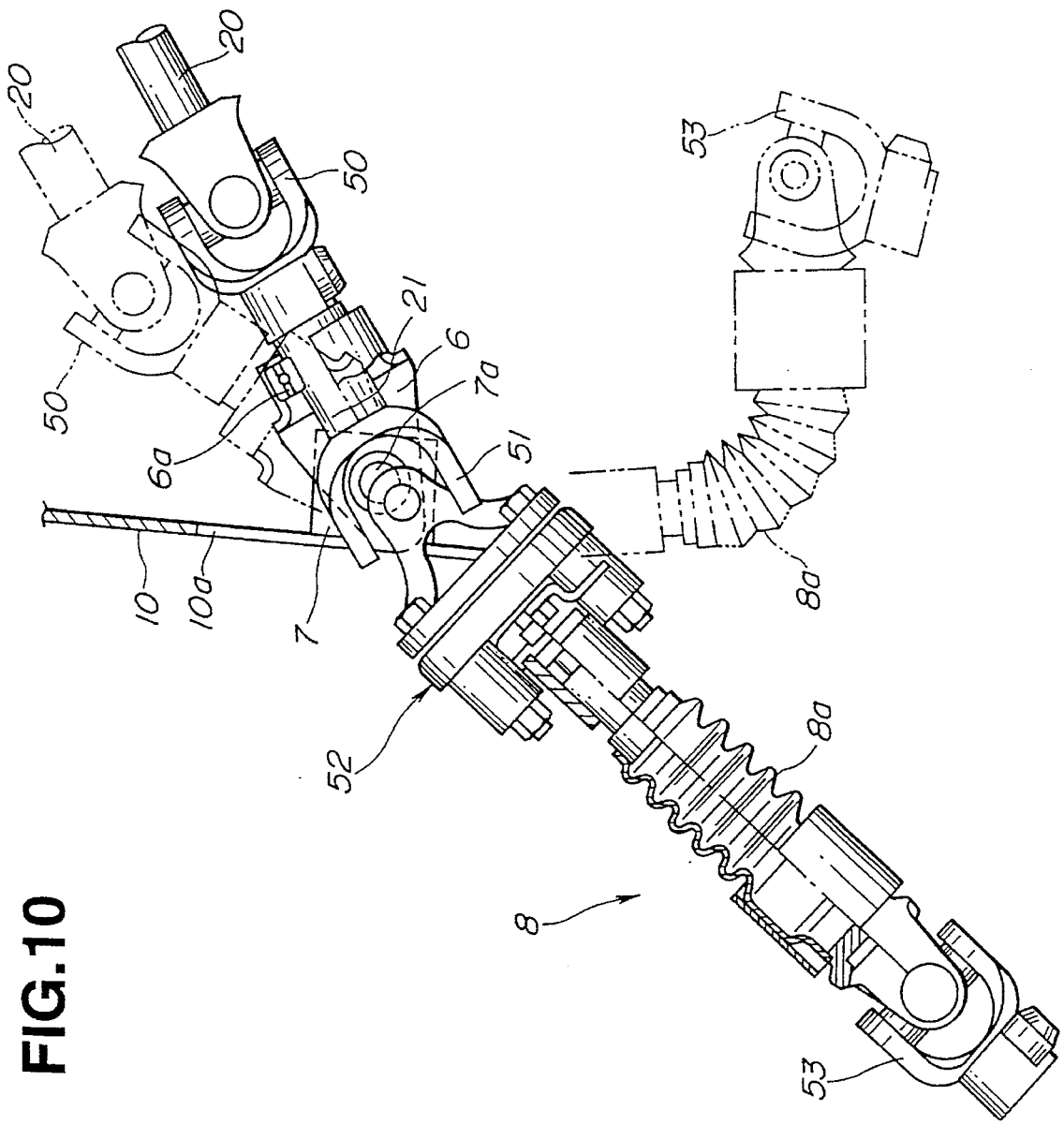
FIG. 10 is a side elevation of an essential part of the steering system of FIG. 1, showing an operational mode of the steering system.

As shown in FIGS. 1 and 10, the shaft 21 is supported rotatable around its axis by a yoke-shaped bearing bracket 6 which is rotatably supported through a shaft 7a to a bracket 7 fixed to a partition wall 10 forming part of the vehicle body. The partition wall 10 is formed with an opening 10a through which the bearing bracket 6 can enter the opposite side of the partition wall 10 upon a rotational movement of the bearing bracket 6. The bearing bracket 6 is provided with a bearing 6a for rotatably supporting the shaft 21.

The shaft 21 is provided at its lower end section with a universal joint 51 which is located inside the bearing bracket 6 and near the shaft 7a. The shaft 21 is connected through the universal joint 51 to an intermediate shaft 8 having a generally cylindrical bellows 8a made of a metal. The intermediate shaft 8 is bendable and rotatable relative to the shaft 21 under the action of the universal joint 51. The intermediate shaft 8 is connected at its lower end section to a steering gear box 9 through a universal joint 53. The intermediate shaft 8 is provided with a resilient shaft connector 52 located between the universal joint 51 and the bellows 8a. The resilient shaft connector 52 is known as disclosed in Japanese Patent Publication No. 4-75405.

As illustrated in FIG. 2, a hinge bracket 23 of the generally channel shape is fixed to the outer upper surface of the column jacket 22 and disposed between the side wall sections 4a, 4a of the upper bracket 4. The hinge bracket 23 has parallel and opposite side wall sections 23b each of which is formed with an long hole 23a for the steering column telescopic movement. A hinge bolt 24 is inserted in these long holes 23a.

The hinge bolt 24 is disposed to pass through the through-holes 4c, 4c of the side wall sections 4a, 4a of the upper bracket 4 in a manner to be movable in the longitudinal direction of the hinge bracket 23. The hinge bolt 24 has a threaded tip end section which projects out of the side wall section 4a to be fastened through a washer or the like with a nut 24a. A pair of stoppers 25 and rings 26 are mounted on the hinge bolt 24 in a manner that the hinge bolt 24 passes through them. Each stopper 25 is formed with a projection 25a having a square cross-section which projection fits in the long hole 23a of the hinge bracket 23. Accordingly, the front section of the steering column 5 is supported movably in the fore-and-aft direction relative to the upper bracket 4.

A distance bracket 27 is fastened at its upper surface to the outer peripheral lower surface of the column jacket 22 by means of welding or the like in order to allow the rear section of the steering column 5 to be movable in the fore-and-aft direction relative to the upper bracket 4 and to be movable vertically. The distance bracket 27 is disposed between the side wall sections 4a, 4a of the upper bracket 4.

The distance bracket 27 is formed generally channel-shaped and has a predetermined length. The distance bracket 27 has parallel and opposite side wall sections 27a, 27a each of which is formed with a long hole 27b extending parallel with the axis of the column jacket 22. The long hole 27b is for the telescopic movement of the steering column 5.

A reinforcement plate 28 as a lock plate is disposed between and fastened to the side wall sections 27a, 27a of the distance bracket 27 by welding or the like, in which the reinforcement plate 28 extends parallel with the axis of the column jacket 22. The reinforcement plate 28 is formed at its upper surface with teeth 28a which are arranged linear and parallel with the side wall section 27a and located near one side wall section 27a as compared with the other side wall section 27a. The teeth 28a may be formed by embossing a metal sheet. The distance bracket 27 is supported to the upper bracket 4 through a tightening bolt 29.

The tightening bolt 29 is has a predetermined length, and formed at its on end portion with a threaded section 29a and at the other end portion with a ring 29b for preventing the bolt 29 from its rotation. The ring 29b is integral with the tightening bolt 29 and formed at its outer peripheral surface with serrations 29c. A generally ring-shaped rotation preventing member 30 is formed at its inner peripheral surface with internal serrations 30d which is engaged with the serrations 29c of the ring 29b. The serrations 30d define a through-hole 30b for the tightening bolt 29. The rotation preventing member 30 serves as a tightening member for the tightening bolt 29.

Figure 4:
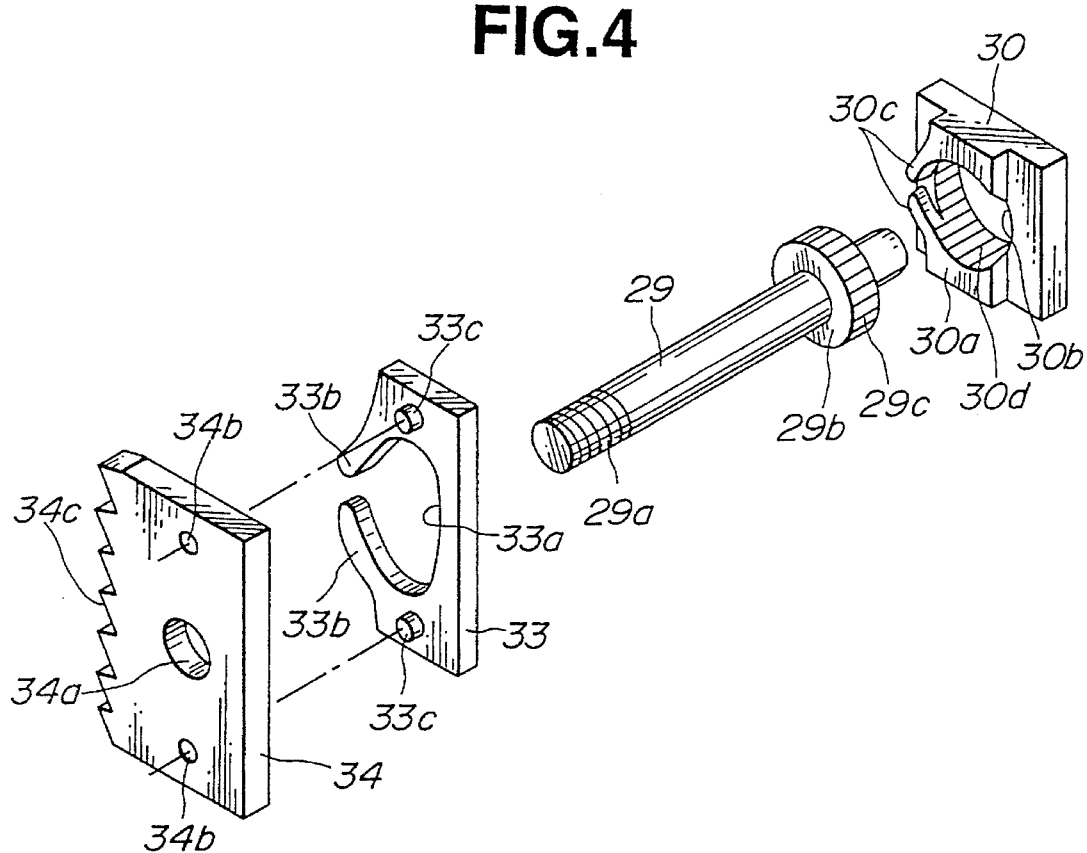
FIG. 4 is an exploded perspective view of an essential part of the steering system of FIG. 1.
Figure 6:
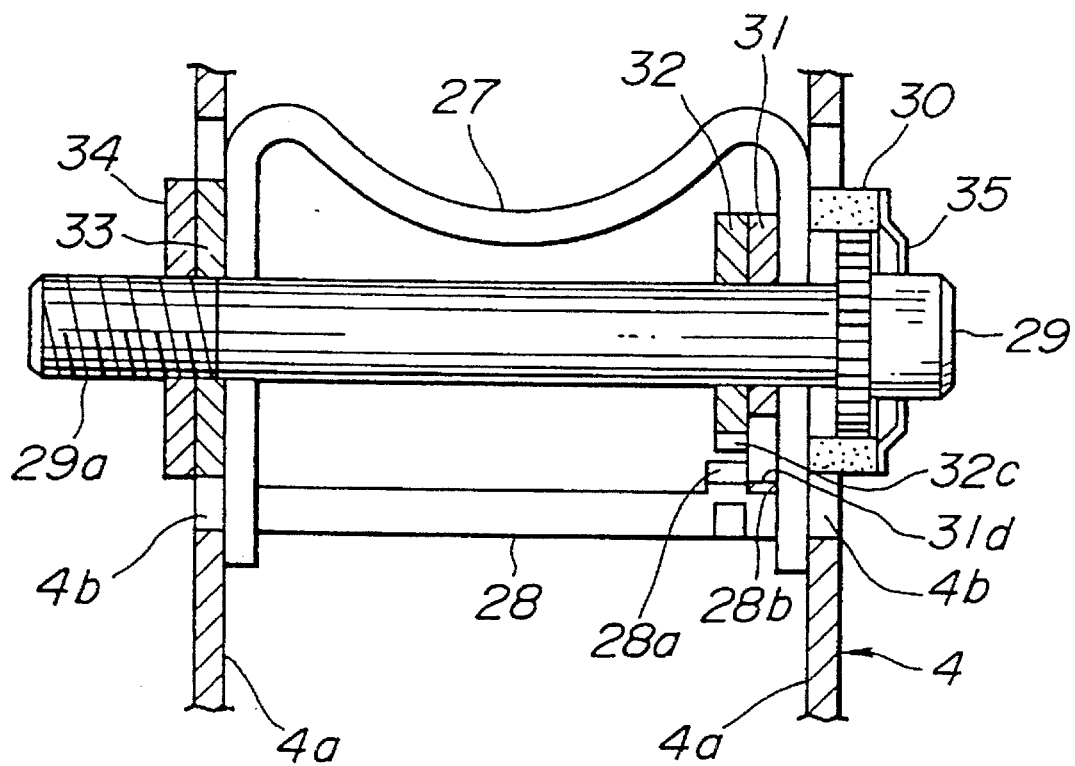
FIG. 6 is a vertical sectional view of an essential part of the steering system of FIG. 1.

The rotation preventing member 30 is made of a plastic and fits in the long hole 4b (for the steering column tilt movement) of the upper bracket 4 in a manner to be vertically slidable. As shown in FIGS. 4 and 6, the rotation preventing member 30 is formed with a projection 30a which is generally rectangular in cross-section and slidably fits in the long hole 4b. The rotation preventing member 30 is formed with the through-hole 30b with the internal serrations 30d as described above. The projection 30a is integrally provided with a pair of spring sections 30b which are brought into springing contact with a vertical wall defining the long hole 4b of the upper bracket 4.

The tightening bolt 29 is inserted at its one end portion formed with the threaded section 29a through the long hole 4b (for the steering column tilt movement) of one side wall section 4a of the upper bracket 4 and passes through the long holes 27b, 27b (for the steering column telescopic movement) of the distance bracket 27, and then passes through the long hole 4b (for the steering column tilt movement) of the other side wall section 4a of the upper bracket 4.

The rotation preventing member 30 is fitted on the rotation preventing ring 29b integrally formed on the tightening bolt 29 under engagement of the serrations 29c, 30d. The projection 30a of the rotation preventing member 30 is fitted in the long hole 4b of the side wall section 4a of the upper bracket 4. Additionally, as shown in FIG. 6, a push nut 35 is pressed on and brought into contact with the rotation preventing member 30 in a manner to fit around a tip end portion of the tightening bolt 29.

Figure 7:
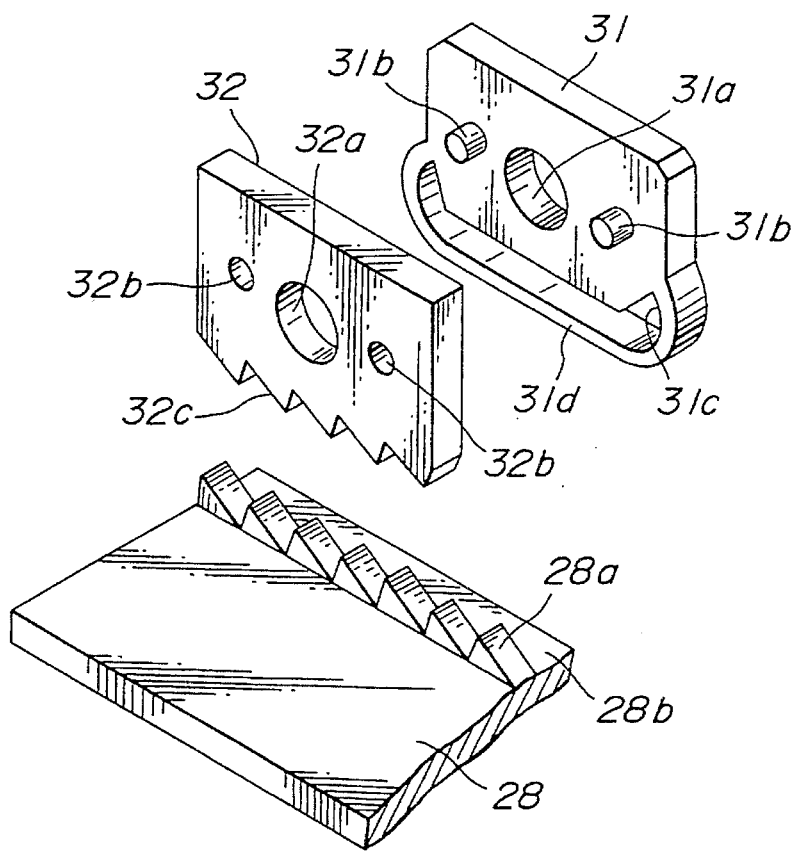
FIG. 7 is an exploded perspective view of an essential part of the steering system of FIG. 1.
Figure 8:
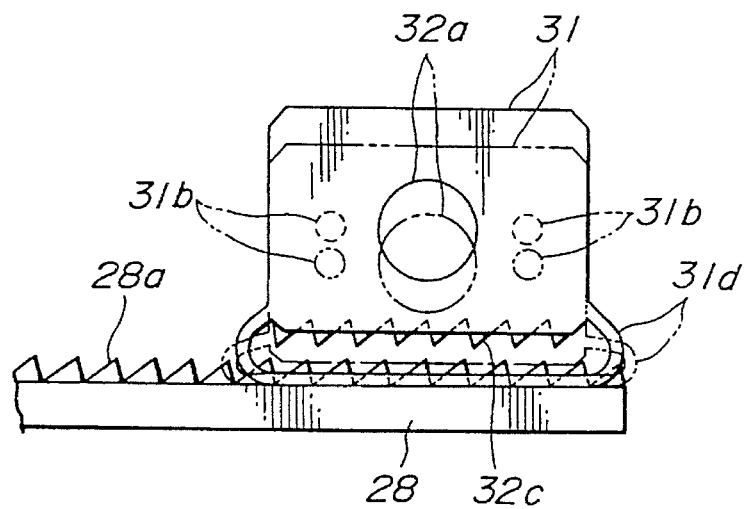
FIG. 8 is a side view of the essential part of FIG. 7.

As shown in FIGS. 2, 7 and 8, a positioning member 31 and a lock plate 32 are inserted in a space defined by the distance bracket 27 and the reinforcing plate 28. The positioning member 31 is made of a plastic and located on the surface of a narrow section 28b of the reinforcement plate 28 which narrow section 28b is positioned between the teeth 28a and the side wall section 27a of the distance bracket 27 (or the side edge of the reinforcement plate 28). The positioning member 31 is formed with a through-hole 31a through which the tightening bolt 29 passes. Two projections 31b, 31b are formed on the side surface of the positioning member 31 and located on the opposite sides of the through-hole 31a. Additionally, the positioning member 31 is formed at its lower section with a laterally extending long hole 31c, leaving a generally C-shaped or spring portion 31d which is integral with the body of the positioning member 31.

The lock plate 32 is formed with a through-hole 32a through which the tightening bolt 29 passes, and with through-holes 32b, 32b to which the projections 31b, 31b of the positioning member 31 are respectively fitted in. Additionally, the lock plate 32 is provided at its bottom edge with teeth 32c which face to and are engageable with teeth 28a of the reinforcement plate 28. The spring 31d slidably move on the narrow section 28b and be adapted to normally cause the teeth 32c of the lock plate 32 to separate from and disengage with the teeth of the reinforcement plate 28, thus making the positioning of the lock plate 32.

As shown in FIGS. 2 and 4, a positioning member 33 and a lock plate 34 are mounted on the tip end portion of the tightening bolt 29 and located in contact with the side wall section 4a in a manner that the tightening bolt 29 passes through them. The positioning member 33 is made of a plastic and formed generally C-shaped to form a partial cutout, in which a through-hole 33a through which the tightening bolt 29 is formed. Opposite elongate (spring) portions 33b, 33b defining the cutout serve as springs. The positioning member 33 are formed with two projections 33c which project from its side surface and are formed under embossing.

The lock plate 34 is formed of a metal plate and formed with a though-hole 34a through which the tightening bolt 29 passes. The lock plate 34 is further formed with two through-holes in which the projections 33c, 33c of the positioning member 33 are fitted. Teeth 34c are formed at the side edge of the lock plate 34 and located facing the teeth 16a of the lock plate 16 in a manner to be engageable with the teeth 16a.

Figure 5A:
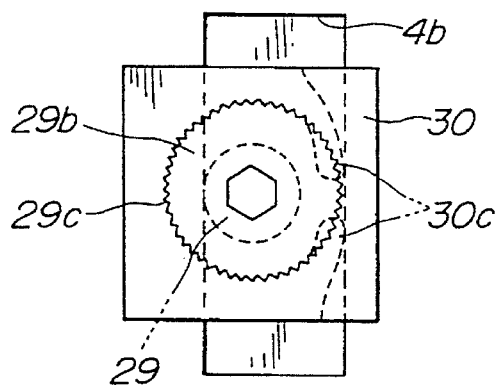
FIG. 5A is a side view of the essential part of FIG. 4.
Figure 5B:
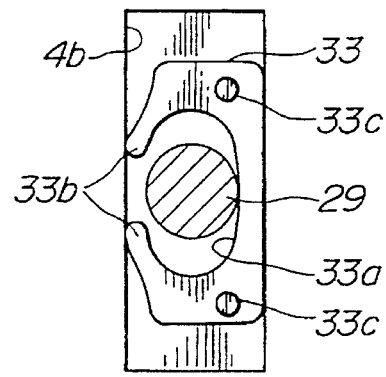
FIG. 5B is a side view of the essential part of FIG. 4 as viewed from the opposite direction of the view of FIG. 5A.

As shown in FIG. 5B, the positioning member 33 is fitted in the long hole 4b of the upper bracket 4 in such a manner that the spring portions 33b are brought into contact with the vertical surface defining the long hole 4b. The lock plate 34 is fixedly fastened to the positioning plate 33 as a one-piece member upon engagement of the projections 33c and the through-holes 34b, so that the lock plate 34 is in slidable contact with the surface of the side wall section 4a around the long hole 4b in a manner to be slidable vertically. The spring portions 33b, 33b are adapted to normally cause the teeth 34c of the lock plate 34 to separate from and disengage with the teeth 16a of the lock plate 16, thereby accomplishing the locationing of the lock plate 34.

Furthermore, a washer 36 is mounted on the threaded section 29a of the tightening bolt 29. Additionally, a nut 37 is mounted to be engaged with the threaded section 29a. An operation lever 38 is fixedly mounted on the nut 37 under welding in a manner that the nut 37 fits in a polygonal hole 38a of the lever 38. An end portion 39a of the lift spring 39 is in contact with the tightening bolt 29 inside the distance bracket 27, while the other end portions 39b are inserted respectively in the engagement holes 4e, 4e formed respectively at the side wall sections 4a, 4a of the upper bracket 4. Accordingly, the tightening bolt 29 is always biased upwardly under the action of the lift spring 39.

Figure 9A:
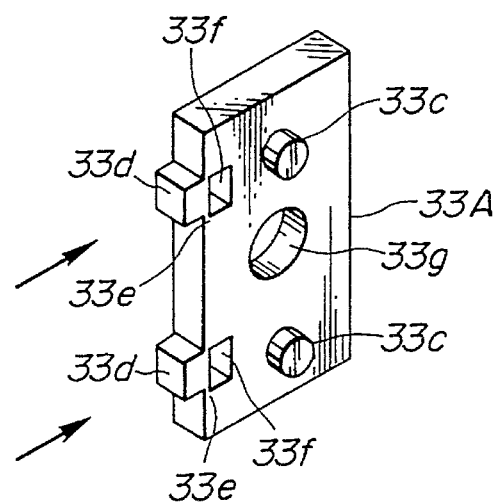
FIG. 9A is a perspective view showing a modified example of a positioning member used in the steering system of FIG. 1.
Figure 9B:
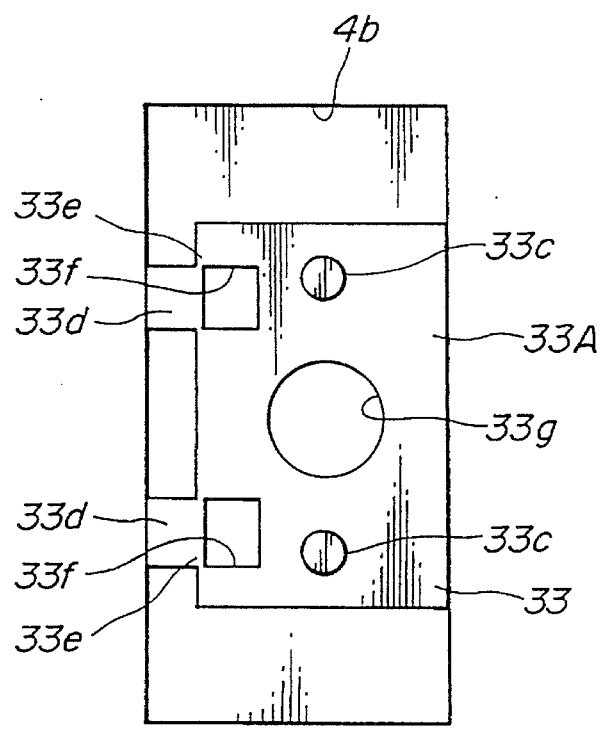
FIG. 9B is a side view of the positioning member of FIG. 9A.

While the positioning members 31, 33 have been shown and described as accomplishing the locationing under the action of the springs 31d, 33b, it will be understood that they may be replaced with a positioning member 33A as shown in FIG. 9. The positioning member 33A is provided at its edge with two separate projections 33d (rectangular in cross-section) which are located in place of the spring portion 31d, 33b. The positioning member 33A is formed with spaces 33f, 33f located respectively near the projections 33d in such a manner that the projection 33d can enter the corresponding space 33f upon shearing or breakage of a thin base portions 33e through which each projection 33d is integral with the main body of the positioning member 33A adjacent the space 33f. When an excess load is applied in a direction of arrows, the base portions 33e is sheared or broken so that the projections 33d enter the respective spaces 33f. The positioning member 33A is, of course, formed with a through-hole 33g through which the tightening bolt 29 passes.

The manner of operation of the above-arranged steering system will be discussed hereinafter.

In order to adjust the tilt of the steering column 5, the operation lever 38 is first rotationally moved downwardly or in a direction far from the upper bracket 4. The nut 37 is rotated to be loosened so that a tightening force of the side wall sections 4a, 4a of the upper bracket 4 against the side wall sections 27a of the distance bracket 27 is released. As a result, the vehicle occupant (driver or passenger) can move the steering wheel 17 upwardly or downwardly thereby setting an optimum tilt angle of the steering column 5 for the vehicle occupant. Then, the operation lever 38 is rotated in the opposite direction to make a reverse rotation of the nut 37, so that the nut 37 applies a force to the side wall section 4a. As a result, the side wall sections 4a, 4a of the upper bracket 4 tightens the side wall sections 27a of the distance bracket 27 thereby developing a frictional force to fix the steering column 5 at the set tilt angle.

Next, in order to telescopically adjust the steering column 5, the operation lever 38 is rotationally moved downwardly thereby releasing the tightening force applied to the side wall sections 4a, 4a of the upper bracket 4. Then, the steering wheel 17 is moved forward or rearward in which the splined tube 19 (receiving the lower shaft 20) and the upper shaft 18 are connected with the steering wheel 17 as a one-piece body and can be move forward or rearward together with the column jacket 22.

At this time, the hinge bracket 23 move upon guidance by the hinge bolt 24 passing through the long hole 23a for the steering column telescopic movement, while the distance bracket 27 moves upon guidance by the tightening bolt 29 passing through the long hole 27b for the steering column telescopic movement. Here, the operation lever 38 is rotated in a reverse direction at a desired position of the steering wheel 17 thereby pressing or tightening the side wall sections 4a, 4a of the upper bracket 4 against the side wall sections 27a, 27a of the distance bracket 27 so that a frictional force is developed to fix the position of the steering wheel 17.

In the above tilt and telescopic adjustment of the steering column 5, the spring portion 31d of the positioning member 31 causes the teeth 32c of the lock plate 32 to separate from and disengage with the teeth 28a of the reinforcement plate 28. Additionally, the spring portions 33b causes the teeth 34c of the lock plate 34 to separate from and disengage with the teeth 16a of the lock plate 16. As a result, no problem arises in axial and vertical movements of the column jacket 22.

When a vehicle collision occurs and a secondary collision is made so that the vehicle occupant (such as a driver or a passenger) collides with the steering wheel 17, the vehicle occupant moves forward and comes into direct contact with the steering wheel 17. At this time, since the steering wheel 17 inclines relative to the vehicle occupant, the impact load of the vehicle occupant is applied to the column jacket 22 through the upper shaft 18 and the bearing 22a and develops a force for urging the column jacket 22 downwardly in the axial direction and anther force for turning the column jacket 22 upwardly around the hinge bolt 24. Accordingly, the distance bracket 27 is pressed against the tightening bolt 29.

Then, the frictional force due to the tightening force of the tightening bolt 29 is defeated by the impact load, and therefore the tightening bolt 29 moves in the long hole 4b (for the steering column tilt movement) in a direction from one to the other side of the long hole 4b. Additionally, the tightening bolt 29 moves also in the long hole 27b for the steering column telescopic movement. As a result, the spring portion 33b of the positioning member 33 within the long hole 4b deflects so that the teeth 34c of the lock plate 34 are brought into engagement with the teeth 16a of the lock plate 16 thereby providing a locking action to the tilt movement of the steering column 5. Simultaneously, the spring portion 31*d* of the positioning member 31 deflects so that the teeth 32*c* of the lock plate 32 are brought into engagement with the teeth 28*a* of the reinforcement plate 28 thereby providing a locking action to the telescopic movement of the steering column 5. Thus, a fixed relationship is established between the column jacket 22 and the upper bracket 4 so that no relative movement is made therebetween.

Upon addition of a further impact load to the steering wheel 17, the upper bracket 4 moves horizontally toward the vehicle body front section, and therefore the upper bracket 4 moves parallely with the mounting bracket 2. Accordingly, the screws 15 engaged with the respective nuts 13 projecting the side wall sections 4*a* of the upper bracket 4 separate from the plates 11 together with the slide plates 14 and move forward in the long slide holes 2*b*. At this time, the upper bracket 4 pulls the central band-like portion (formed with the through-hole 3*b*) of the energy absorbing member 3 so that the energy absorbing member 3 is torn off along the linear cuts 3*a*, 3*a*, so that the energy absorbing member 3 can absorb the impact energy under its breakage (fracture) and plastic deformation.

Additionally, as indicated in phantom in FIG. 10, as the upper bracket 4 moves forward, the lower shaft 20 horizontally move toward the front section of the vehicle body, and therefore the bearing bracket 6 rotates around the shaft 7*a* thereby to absorb the displacement stroke of the steering column 5. It will be understood that the lower shaft 20 slides toward the upper shaft 18 upon releasing the temporary connection (or shearing the shearing pin or the like) between it and the splined tube 19 so as to contract the steering column 5.

In case that the steering gear box 9 moves backward under the backward movement of a structural member at the vehicle body front section during a head-on collision, the bellows 8*a* of the intermediate shaft 8 can be bent thereby to absorb the displacement stroke of the steering gear box 9. In other words, at a primary collision of the vehicle collision, the intermediate shaft 8 contracts or makes its flexural deformation to absorb the movement amount thereof, and therefore the lower shaft 20 and the upper shaft 18 can be prevented from being pushed up by the intermediate shaft 8. As a result, no trouble is made to the horizontal movement of the upper shaft 18 and the column jacket 22.

While the above embodiment has been shown and described as being arranged such that a telescopic-locking mechanism including the positioning member 31 and the facing lock plates 32, 28 is disposed at the side of only one of the two side wall sections 27*a*, 27*b* of the distance bracket 27; and a tilt-locking mechanism including the positioning member 33 and the facing lock plates 16, 34 is disposed at the side of only one of the two side wall sections 4*a*, 4*a* of the upper bracket 4, it will be appreciated that such telescopic-locking mechanisms may be disposed at the respective sides of the two side wall sections 27*a*, 27*a* of the distance bracket 27; and such tilt-locking mechanisms may be disposed at the respective sides of the two side wall sections 4*a*, 4*a* of the upper bracket 4.

What is claimed is:

1. A steering system for a vehicle, comprising:

a steering column including an upper shaft and a lower shaft, said lower shaft being axially movably connected to said upper shaft, said lower shaft including a first section connected to said upper shaft, and a second section;

an upper bracket connected to said steering column;

an energy absorbing member through which said upper bracket is connected to a vehicle body to be generally horizontally movable relative to the vehicle body;

a first universal joint disposed between said first and second sections of said lower shaft;

a bearing bracket rotatably supported to the vehicle body and rotatably supporting said second section of said lower shaft;

an intermediate shaft; and a second universal joint disposed between a lower end section of said second section of said lower shaft and an upper end section of said intermediate shaft.

2. A steering system as claimed in claim 1, further comprising a mounting bracket fixed to the vehicle body, wherein said upper bracket is movably connected through said energy absorbing member to said mounting bracket, said energy absorbing member including means for absorbing an impact energy applied to said upper bracket under a fracture and a deformation of a structure of said energy absorbing member.

3. A steering system as claimed in claim 2, wherein said mounting bracket includes means for allowing said upper bracket to slidably move horizontally and forward relative to the vehicle body, wherein said energy absorbing member is interposed between said mounting bracket and said upper bracket, said energy absorbing member having a first portion fixedly connected to said mounting bracket, and a second portion fixedly connected to said upper bracket.

4. A steering system as claimed in claim 1, wherein said steering column includes a column jacket in which said upper shaft and the first section of said lower shaft are coaxially rotatably stored, said upper bracket being securely connected to said column jacket, wherein a splined lower portion of said upper shaft is spline-fitted to a splined upper portion of said lower shaft first section.

5. A steering system as claimed in claim 1, further comprising lock means for disabling said steering column from both tilt and telescopic movements at a secondary collision in a vehicle collision.

* * * * *